United States Patent [19]
Genise

[11] Patent Number: 5,682,790
[45] Date of Patent: Nov. 4, 1997

[54] SYNCHRONIZING AND GEAR ENGAGEMENT SENSING LOGIC FOR AUTOMATED MECHANICAL TRANSMISSION SYSTEM

[75] Inventor: Thomas A. Genise, Dearborn, Mich.

[73] Assignee: Eaton Corporation, Cleveland, Ohio

[21] Appl. No.: 649,829

[22] Filed: Apr. 30, 1996

[51] Int. Cl.[6] ................................................ B60K 41/10
[52] U.S. Cl. .......................... 74/335; 477/78; 477/111; 477/124
[58] Field of Search .......................... 74/336 R, 335; 477/78, 111, 107, 124

[56] References Cited

U.S. PATENT DOCUMENTS

| | | | |
|---|---|---|---|
| 4,850,236 | 7/1989 | Braun | 74/337 |
| 5,105,357 | 4/1992 | Steeby | 364/424.1 |
| 5,193,410 | 3/1993 | Stine et al. | 74/336 |
| 5,315,900 | 5/1994 | Teeter | 477/165 |
| 5,385,515 | 1/1995 | Chan et al. | 477/78 X |
| 5,390,561 | 2/1995 | Stine | 74/331 |
| 5,413,012 | 5/1995 | Davis | 74/335 |
| 5,425,284 | 6/1995 | Davis | 74/335 |
| 5,435,212 | 7/1995 | Menig | 74/745 |
| 5,441,464 | 8/1995 | Markyvech | 477/111 X |
| 5,508,916 | 4/1996 | Markyvech et al. | 74/335 X |

*Primary Examiner*—Charles A. Marmor
*Assistant Examiner*—Peter T. Kwon
*Attorney, Agent, or Firm*—Howard D. Gordon

[57] ABSTRACT

Control logic for an automated mechanical transmission system (100) allows signals indicative of input shaft (IS) and output shaft (OS) rotational speed to be utilized to determine engagement of a target gear ratio ($GR_T$) without false readings caused by engine synchronizing.

39 Claims, 10 Drawing Sheets

SYNCHRONIZING AND GEAR ENGAGEMENT SENSING LOGIC FOR AUTOMATED MECHANICAL TRANSMISSION SYSTEM

RELATED APPLICATIONS

This application is related to the following co-pending patent applications, all assigned to EATON CORPORATION, the assignee of this application:

U.S. Ser. No. 08/649,833, filed Apr. 30, 1966 [94-rTRN-396] INTENT-TO-SHIFT SEMI-AUTOMATIC SHIFT IMPLEMENTATION U.S. Ser. No. 08/649,831, filed Apr. 30, 1996 [93-rTRN-572-DIV] SEMI-AUTOMATIC SHIFT IMPLEMENTATION WITH AUTOMATIC SPLITTER SHIFTING U.S. Ser. No. 08/649,830, filed Apr. 30, 1996 [93-rTRN-572] SEMI-AUTOMATIC SHIFT IMPLEMENTATION

BACKGROUND OF THE INVENTION

1. Field of the Invention

The present invention relates to an at least partially automated control system/method for a mechanical transmission. More particularly, in a preferred embodiment of the present invention, mechanical transmission control logic is provided which allows speed signals, such as engine/input shaft speed and output shaft speed, to be utilized to determine the engaged or disengaged (neutral) condition of the transmission in a transmission system using engine speed control to cause synchronous conditions for engaging a target gear ratio.

2. Description of the Prior Art

Compound range-type mechanical transmissions using so-called "double-H" type controls wherein a range shift is automatically selected by movement of the shift lever, without requiring the operator to use a button or lever to select a range change, are well known in the prior art, as may be seen by reference to U.S. Pat. Nos. 3,429,202; 4,561,325; 4,455,883; 4,663,725 and 4,944,197, the disclosures of which are incorporated herein by reference.

Compound mechanical transmissions of the combined splitter-and-range type are widely used for heavy-duty vehicles and very well known in the prior art, as may be seen by reference to U.S. Pat. Nos. 4,754,665; 4,944,197; 5,193, 410 and 5,390,561, the disclosures of which are incorporated herein by reference.

Semi-automatic shift implementation systems for compound mechanical transmissions wherein, upon manual shifting into a highest grouping of gear ratios, automatic shifting within only that highest grouping is provided, are known in the prior art and are disclosed in U.S. Pat. Nos. 4,722,248 and 5,038,627, the disclosures of which are incorporated herein by reference. Semi-automatic shift implementation systems for mechanical transmissions wherein the vehicle operator is required to manually cause a torque interruption and/or achieve synchronous conditions are known in the prior art and are disclosed in U.S. Pat. No. 5,053,961, the disclosure of which is incorporated herein by reference.

At least partially automated systems wherein engine fuel control, such as engine dither, is utilized to cause non-torque-lock conditions for shifting into neutral without requiring master clutch manipulation are known in the prior art and are disclosed in U.S. Pat. Nos. 4,850,236 and 5,105,357, the disclosures of which are incorporated herein by reference.

Partially automated mechanical transmission systems wherein engine fueling, with the master clutch engaged, is used to control input shaft rotational speed are well known in the prior art, as may be seen by reference to U.S. Pat. Nos. 4,360,065; 5,335,566 and 5,272,939, the disclosures of which are incorporated herein by reference.

U.S. Pat. No. 5,435,212, the disclosure of which is incorporated herein by reference, discloses a semi-automatic shift implementation system which, for each lever position, has automatic splitter shifting, which allows a "(2+1)×(2)× (2)" type compound 10-speed transmission to be driven with the ease of a 5-speed automatic transmission.

The above systems, as disclosed, were not totally satisfactory for certain applications, as the control logic could not distinguish between engagement of a target gear ratio and engine attempts to cause synchronous conditions to engage the target ratio on only the basis of input signal or stored values indicative of input shaft speed (IS), output shaft speed (OS) and the numerical value of the target gear ratio ($GR_T$). This required the use of additional sensors, such as position sensors, or additional control routines.

SUMMARY OF THE INVENTION

In accordance with the present invention, control logic for an automated mechanical transmission system of the type synchronizing for engaging a target gear ratio by causing the engine to rotate the input shaft at a synchronous speed (engine speed equals input shaft speed (ES=IS) with the master clutch engaged) for engaging a target gear ratio at a given output shaft speed (ES=IS=(OS*$GR_T$)±X) is provided which allows engagement of the target gear ratio to be determined as a function of the input shaft and output shaft speeds.

The foregoing is accomplished by utilizing control logic wherein, to engage a target gear ratio when the transmission is in neutral with the master clutch engaged, the engine is fueled to cause engine speed to equal a speed offset, and not within, true synchronous speed for engaging the target ratio by a first offset value equal to about +60 or −60, preferably about −60 RPM (ES=IS=(OS*$GR_T$)+X), while engagement of the target ratio is declared if input shaft speed is within a second offset value, smaller than the first offset value (|X|>|Y|), about ±20 RPM, for a predetermined period of time (((OS*$GR_T$)−Y)≦IS≦((OS*$GR_T$)+Y)).

Accordingly, by utilizing the control logic of the present invention, signals indicative of input and output shaft speeds may be used to verify engagement of a target gear ratio without false determinations caused by engine synchronizing.

This and other objects and advantages of the present invention will become apparent from a reading of the following description of the preferred embodiments taken in connection with the attached drawings.

DESCRIPTION OF THE PREFERRED EMBODIMENT

Figure 1:
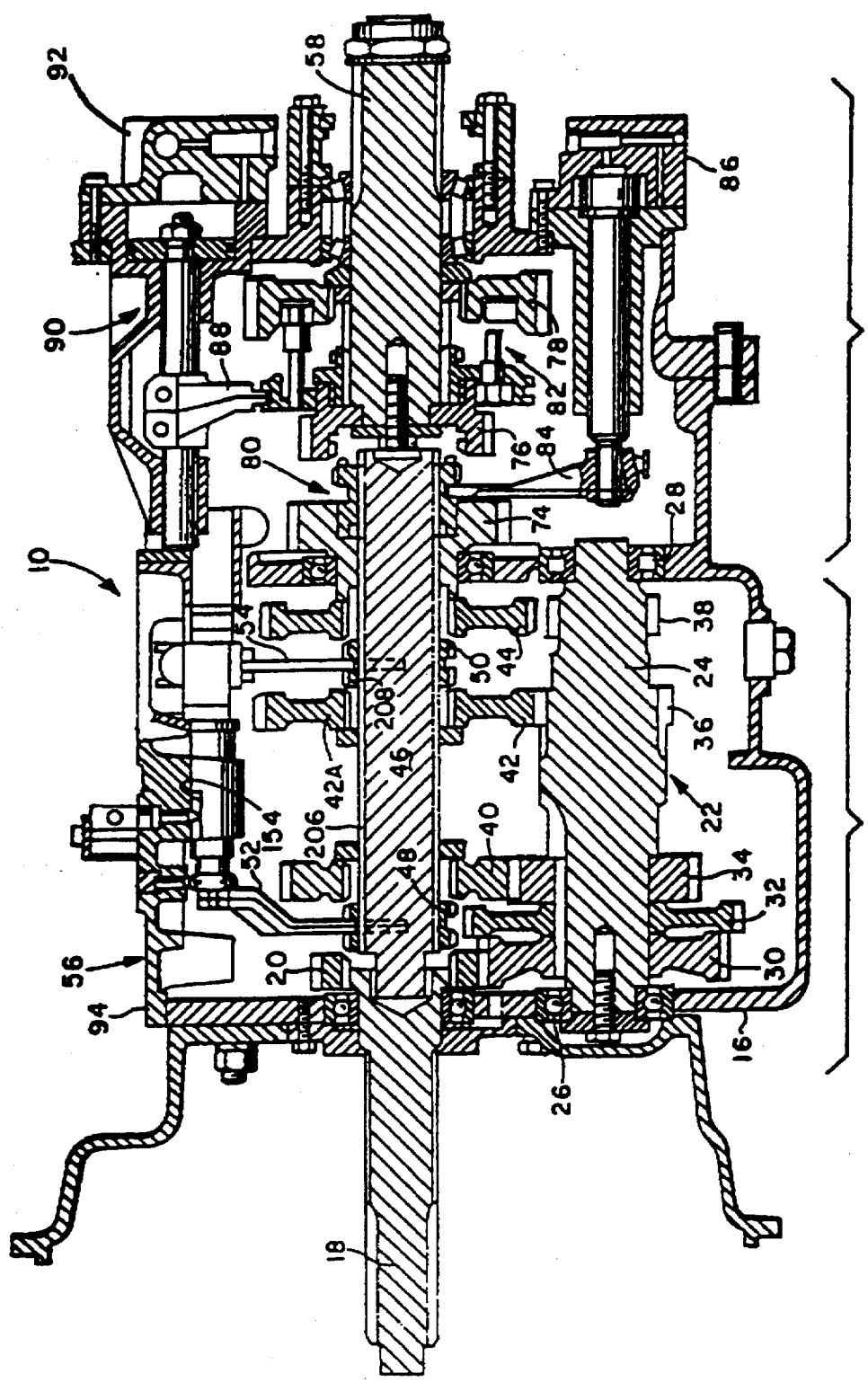
FIGS. 1 and 1A are a plan view of a combined range-and-splitter-type compound transmission.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer, respectively, to the front and rear ends of the transmission as conventionally mounted in a vehicle, being respectively from the left and right sides of the transmission illustrated in FIG. 1. The words "inwardly" and "outwardly" will refer, respectively, to directions toward and away from the geometric center of the device and designated parts thereof. Said terminology will include the words above specifically mentioned, derivatives thereof and words of similar import.

The term "compound transmission" is used to designate a change-speed or change-gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio, and the term "downshift" as used herein shall mean the shifting from a higher speed gear ratio to a lower speed gear ratio.

Figure 1A:
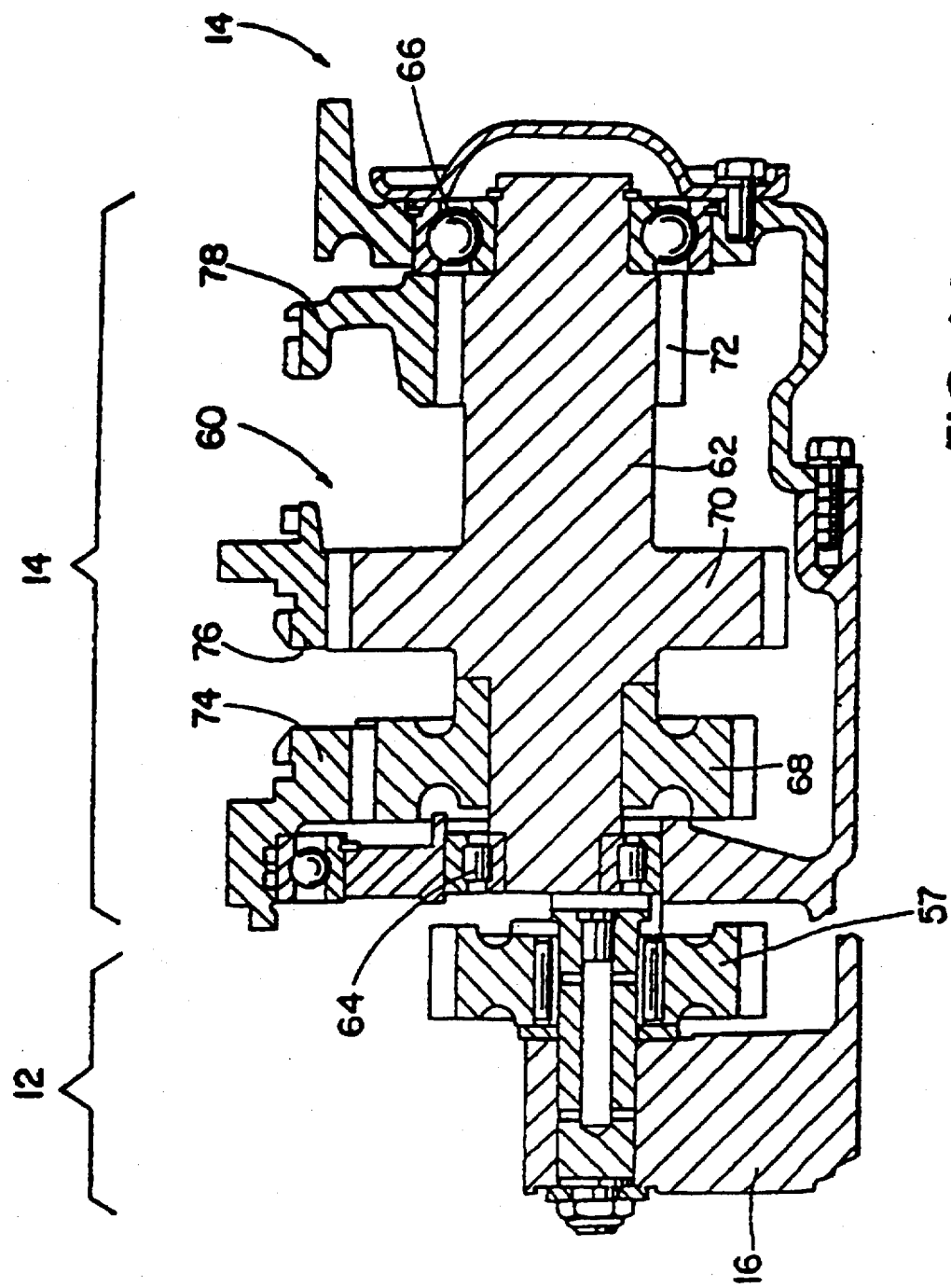

FIGS. 1 and 1A illustrate a combined range-and-splitter-type compound transmission 10 which is especially well suited for control by the semi-automatic shift implementation control system/method of the present invention. Transmission 10 comprises a main transmission section 12 connected in series with an auxiliary transmission section 14 having both range- and splitter-type gearing. Typically, transmission 10 is housed within a single multi-piece housing 16 and includes an input shaft 18 driven by a prime mover, such as a diesel engine, through a selectively disengaged, normally engaged, master friction clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are incorporated herein by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or mainshaft gears 40, 42 and 44 surround the transmission mainshaft 46 and are selectively clutchable, one at a time, to the mainshaft 46 for rotation therewith by sliding clutch collars 48 and 50, as is well known in the art. Clutch collar 48 also may be utilized to clutch input gear 20 to the mainshaft 46 to provide a direct drive relationship between the input shaft 18 and the mainshaft 46. Preferably, each of the main section mainshaft gears encircles the mainshaft 46 and is in continuous meshing engagement with and is floatingly supported by the associated countershaft gear groups, which mounting means and special advantages resulting therefrom are explained in greater detail in aforementioned U.S. Pat. Nos. 3,105,395 and 3,335,616. Typically, clutch collars 48 and 50 are axially positioned by means of shift forks or yokes 52 and 54, respectively, associated with a shift bar housing assembly 56, which may be of the multiple-shift-rail or single-shift-shaft type, as is known in the prior art, and which is manually controlled by a shift lever 57. Clutch collars 48 and 50 are, in the preferred embodiment, of the well-known, non-synchronized, double-acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially non-displaced, non-engaged position, as illustrated, or in a fully rightwardly engaged or fully leftwardly engaged position.

Auxiliary transmission section 14 is connected in series with main transmission section 12 and is of the three-layer, four-speed combined splitter/range type, as illustrated in aforementioned U.S. Pat. Nos. 4,754,665 and 5,390,561. Mainshaft 46 extends into the auxiliary section 14 and is journalled in the inward end of the output shaft 58, which extends from the rearward end of the transmission.

Auxiliary transmission section 14 includes in the preferred embodiment thereof a plurality of substantially identical auxiliary countershaft assemblies 60 (see FIG. 1A), each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78, which surrounds the output shaft 58. Accordingly, auxiliary section countershaft gears 68 and splitter gear 74 define a first gear layer, auxiliary section countershaft gears 70 and splitter/range gear 76 define a second gear layer, and auxiliary section countershaft gears 72 and range gear 78 define a third layer, or gear group, of the combined splitter-and-range-type auxiliary transmission section 14.

A sliding double-sided jaw clutch collar 80 is utilized to selectively couple either the splitter gear 74 or the splitter/range gear 76 to the mainshaft 46, while a two-position synchronized clutch assembly 82 is utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12, and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955, the disclosures of which are incorporated herein by reference. The illustrated synchronized clutch assembly 82 is of the pin type described in aforementioned U.S. Pat. No. 4,462,489.

The splitter jaw clutch 80 is a two-sided or double-acting clutch assembly which may be selectively positioned in the rightwardmost or leftwardmost positions for engaging either gear 76 or gear 74, respectively, to the mainshaft 46. In the prior art, the splitter jaw clutch 80 is axially positioned by means of a shift fork 84 controlled by a two-position piston actuator 86, which is operable by a driver selection switch (such as a button or the like) on the shift knob, as is known in the prior art. Two-position synchronized clutch assembly 82 also is a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90, the actuation and control of which will be described in greater detail below.

Figure 2:
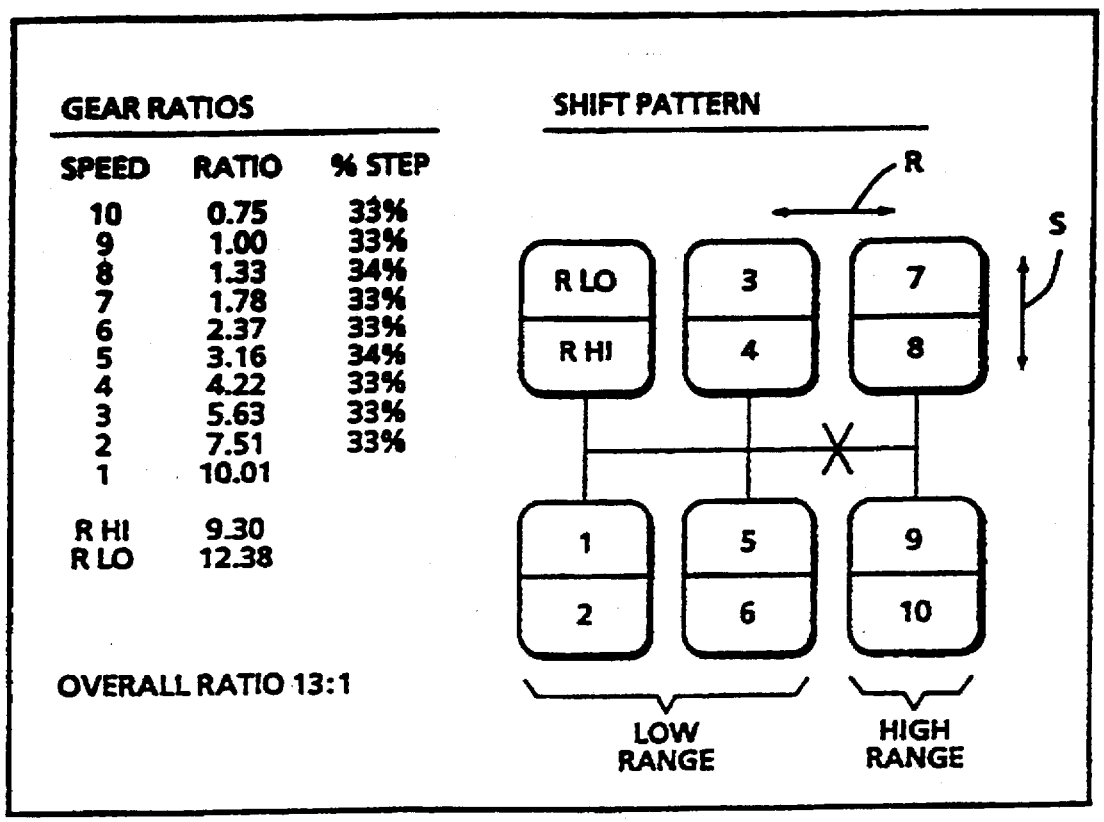
FIG. 2 illustrates a prior art shift pattern for the transmission of FIG. 1.

As may be seen by reference to FIGS. 1–2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three-layer auxiliary section of the combined range-and-splitter type providing four selectable speeds or drive ratios between the input (mainshaft 46) and output (output shaft 58) thereof. The main section 12 provides a reverse and three potentially selectable forward speeds. However, one of the selectable main section forward gear ratios, the low speed gear ratios associated with mainshaft gear 42, is not utilized in the high range. Thus, transmission 10 is properly designated as a "(2+1)×(2)×(2)" type transmission providing nine or ten selectable forward speeds, depending upon the desirability and practicality of splitting the low gear ratio. While clutch 82, the range clutch, should be a synchronized clutch, double-acting clutch collar 80, the splitter clutch, is not required to be synchronized.

According to the prior art, as disclosed in aforementioned U.S. Pat. No. 4,944,197, the main section ratios are selected and implemented manually by a shift lever, splitter shifts are manually selected by operation of a manual selector lever or button, often located on the shift lever or built into the shift knob, and are implemented by a remote two-position actuator. The range shift is manually or automatically selected and implemented by a remote two-position actuator. A separate range control button/lever may be provided, or as illustrated in FIG. 2, a lever operated "double-H" type control may be utilized. Range and splitter actuators and controls of this type are well known in the prior art, as may be seen by reference to U.S. Pat. No. 4,788,889, the disclosure of which is incorporated herein by reference.

The prior art shift pattern for shifting transmission 10 is schematically illustrated in FIG. 2. Divisions in the vertical direction at each gear lever position signify splitter shifts, while movement in the horizontal direction from the ¾ and ⅝ leg of the "H" pattern to the ⅞ and 9/10 leg of the "H" pattern signifies a shift from the low range to the high range of the transmission. As discussed above, in the prior art, splitter shifting is accomplished in the usual manner by means of a vehicle operator-actuated splitter button or the like, usually a button located at the shift lever knob. Operation of the range clutch shifting assembly is an automatic response to movement of the gear shift lever between the central and rightwardmost legs of the shift pattern, as illustrated in FIG. 2. Range shift devices of this general type are known in the prior art, as may be seen by reference to aforementioned U.S. Pat. Nos. 3,429,202; 4,455,883; 4,561,325 and 4,663,725.

Referring again to FIG. 2, assuming it is desirable that a transmission have generally equal ratio steps, the main section ratio steps should be generally equal, the splitter step should be generally equal to the square root of the main section ratio steps, and the range step should equal about the main section ratio step raised to the $N^{TM}$ power where N equals the number of main section ratio steps occurring in both ranges (i.e., N=2 in the (2+1)×(2)×(2) transmission 10). Given the desired ideal ratios, gearing to approximate these ratios is selected. In the above example, the splitter steps are about 33.3%, while the range step is about 316%, which is generally suitable for a "2+1" main transmission section having about 78% steps, as the square root of 1.78 equals about 1.33, and 1.78 raised to the second power (i.e.. N=2) equals about 3.16.

To accomplish a shifting of the range section of the transmission 10 without requiring the operator to actuate any control device other than the gear lever movements to the rightwardmost leg of the shift pattern as seen in FIG. 2, a range control valve assembly is provided to provide a signal to a slave valve 92, located at piston assembly 90, to shift the shift fork 88.

Figure 3:
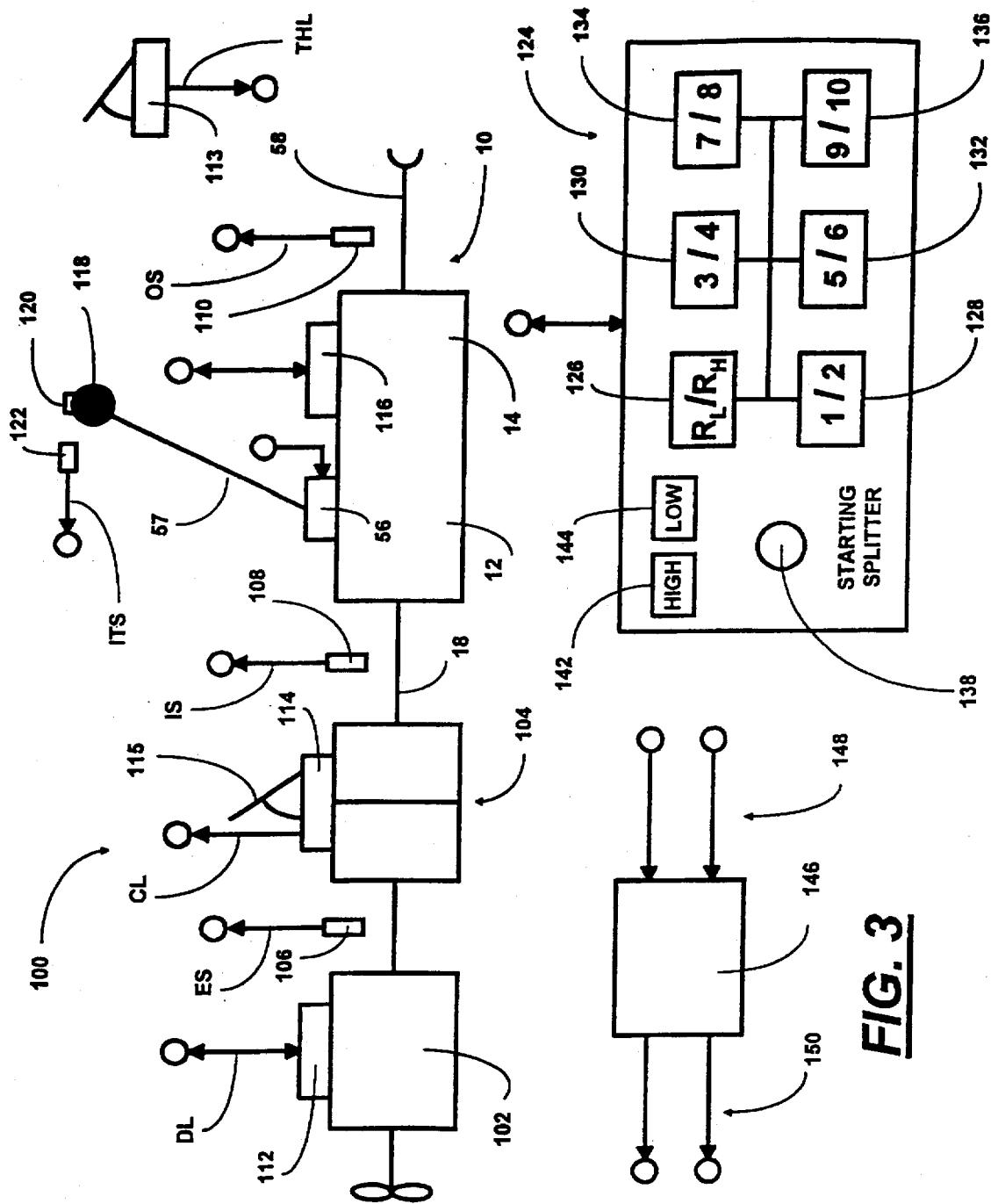
FIG. 3 is a schematic illustration, in block diagram format, of a preferred embodiment of the semi-automated shift implementation transmission system of the present invention.

According to the present invention, at least the forward shifting of transmission 10 is semi-automatically implemented by the vehicular semi-automatic transmission system 100, illustrated in FIG. 3. A compound-type transmission 10 comprising a main section 12 coupled to an auxiliary section 14 controlled by the shift control system/method of the invention, is seen in FIG. 3. Main section 12 includes input shaft 18, which is operatively coupled to the drive or crank shaft of the vehicle engine 102 by master clutch 104, and output shaft 58 of auxiliary section 14 is operatively coupled, commonly by means of a drive shaft, to the drive wheels of the vehicle (not shown).

The change-gear ratios available from main transmission section 12 are manually selectable by positioning the shift lever 57 according to the shift pattern prescribed to engage the particular change gear ratio of main section 12 desired. As will be described, manipulation of the master clutch 104 and manual synchronizing is not required. Preferably, the system will include means to sense an intent to shift and will automatically take actions to minimize or relieve torque-lock conditions, allowing an easier shift into main section neutral from the engaged main section ratio and further allowing required splitter shifts to be preselected for rapid completion upon a torque break and shift into neutral.

The system 100 includes sensors 106 for sensing engine rotational speed (ES), 108 for sensing input shaft rotational speed (IS), and 110 for sensing output shaft rotational speed (OS) and providing signals indicative thereof. Engine 102 may be electronically controlled, including an electronic controller 112 communicating over an electronic data link (DL) operating under an industry standard protocol such as SAE J-1922, SAE J-1939, ISO 11898 or the like. Throttle position (driver demand) is a desirable parameter for selecting shifting points and in other control logic. A separate throttle position sensor 113 may be provided or throttle position (THL) may be sensed from the data link.

A manual clutch pedal 115 controls the master clutch, and a sensor 114 provides a signal (CL) indicative of clutch-engaged or -disengaged condition. The condition of the master clutch also may be sensed by comparing engine speed to input shaft speed. A splitter actuator 116 is provided for operating the splitter clutch 82 in accordance with command output signals. The shift lever 57 has a knob 118 which contains sensing means or a button 120 by which a driver's intent to shift may be sensed. Sensor 122 provides a signal (ITS) indicative of the sensed presence or absence of the driver's intent to shift into neutral. Various other sensors sensing movement of the shift lever may be utilized, as may be seen by reference to SAE Paper No. 840307.

A driver's control display unit 124 includes a graphic representation of the six-position shift pattern with individually lightable buttons or other display elements 126, 128, 130, 132, 134 and 136 representing each of the selectable engagement positions. The unit also includes a button 138 connected to toggle-type controls for selecting the high or low splitter range for start-from-stop splitter position selection. The selection will be indicated by lights 142 or 144.

The system includes a control unit 146, preferably a microprocessor-based control unit of the type illustrated in U.S. Pat. Nos. 4,595,986 and 4,361,065, the disclosures of which are incorporated herein by reference, for receiving input signals and processing same according to predetermined logic rules to issue command output signals 150 to system actuators, such as the splitter section actuator 116, the engine controller 112 and the display unit 124. A separate system controller 146 may be provided, or the engine controller 112 communicating over an electronic data link may be utilized.

The splitter actuator 116 may be a two-position device or, as shown in copending patent application U.S. Ser. No. 08/597,304, a three-position device, allowing a selectable and maintainable splitter section neutral.

Forward dynamic splitter-only shifts, such as third-to-fourth and fourth-to-third shifts, are automatically implemented without driver intervention. By way of example, assuming a three-position splitter actuator, upon sensing that a splitter shift is required, the ECU 146 will issue commands to the actuator 116 to bias the actuator toward neutral, and to engine controller 112 to minimize or break torque. As soon as splitter neutral is sensed, the engine will be commanded to a synchronous engine speed for the target gear ratio at current output shaft speed ($ES=IS=OS*GR_T \pm_{ERROR}$). The engagement is timed, in view of reaction times and shaft speeds and accelerations, to occur just off synchronous to prevent clutch butting. Automatic splitter shifting of this type is illustrated in aforementioned U.S. Pat. Nos. 4,722,248 and 5,435,212.

The engaged and neutral (not engaged) conditions of transmission 10 may be sensed by comparing the input shaft/output shaft rotational speeds to known gear ratios ($IS/OS=GR_{i=1\ to\ 10} \pm Y$?) for a period of time. Position sensors may be utilized in lieu of or in addition to input shaft and output shaft speed logic.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS \times GR_T)-45$ RPM) to achieve a good quality jaw clutch engagement without butting. To verify engagement of a target ratio, the system looks for input shaft speed equaling the product of output shaft speed and the numerical value of the target ratio, plus or minus about 10 to 30 RPM ($IS=(OS*GR_T) \pm 20$ RPM) for a period of time, about 100 to 400 milliseconds.

Figure 6:
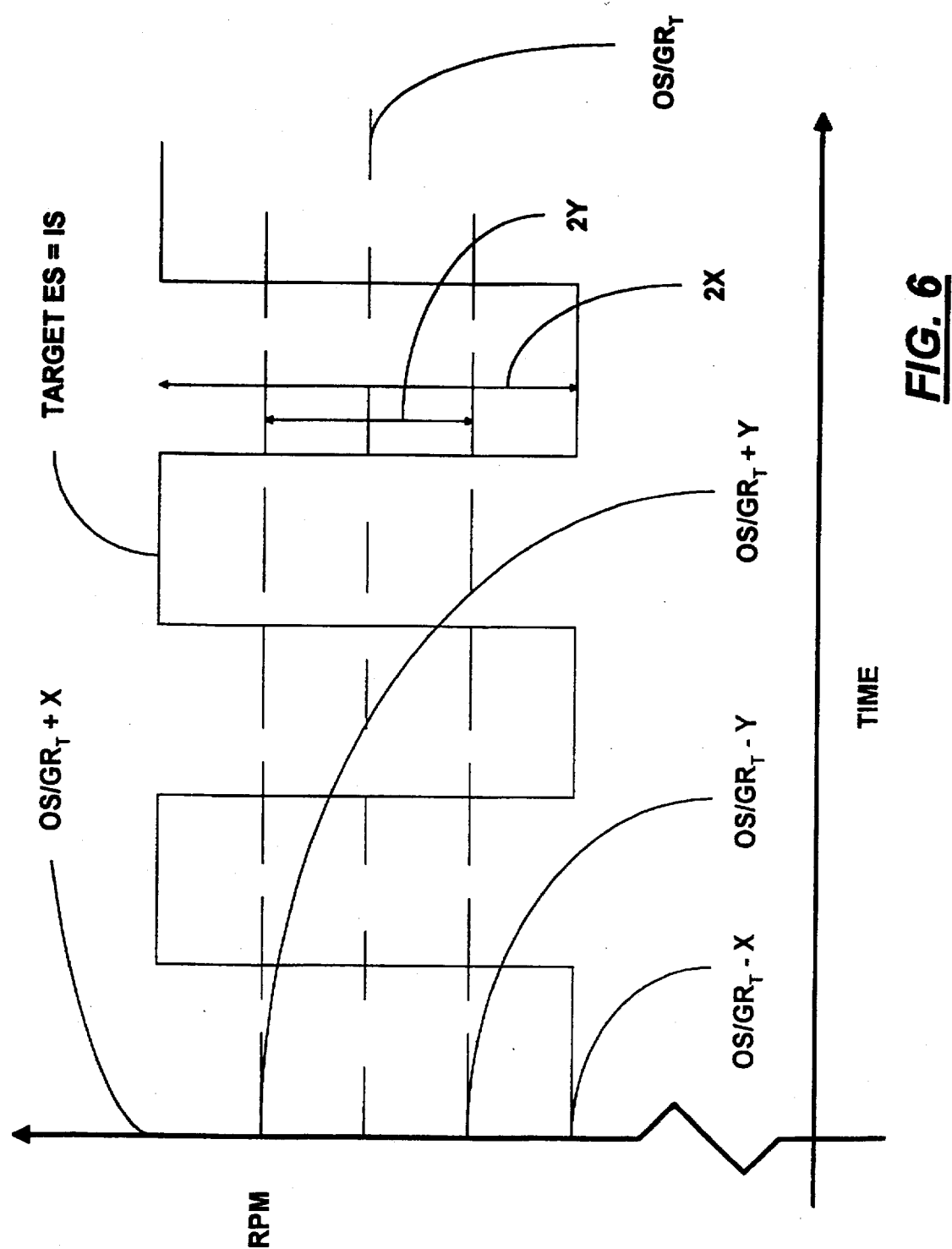
FIG. 6 is a schematic illustration of the present invention.

The foregoing logic, as schematically illustrated in FIG. 6, allows the engaged and neutral conditions of the transmission to be determined on the basis of input and output shaft speeds while minimizing the possibility of false readings due to engine synchronizing.

Figure 4:
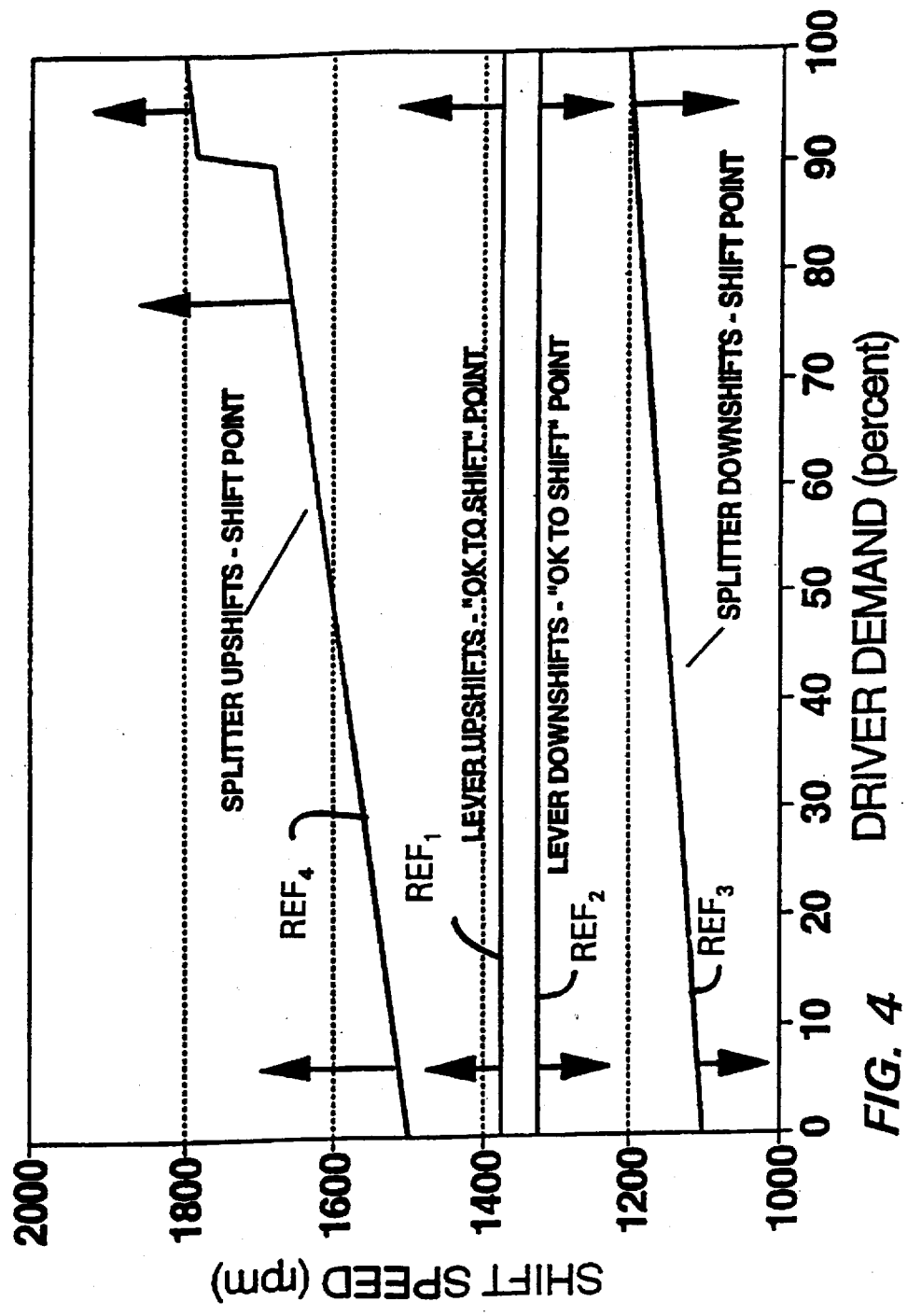
FIG. 4 is a graph illustrating the shift point logic of the control system/method of the present invention.
Figure 5A:
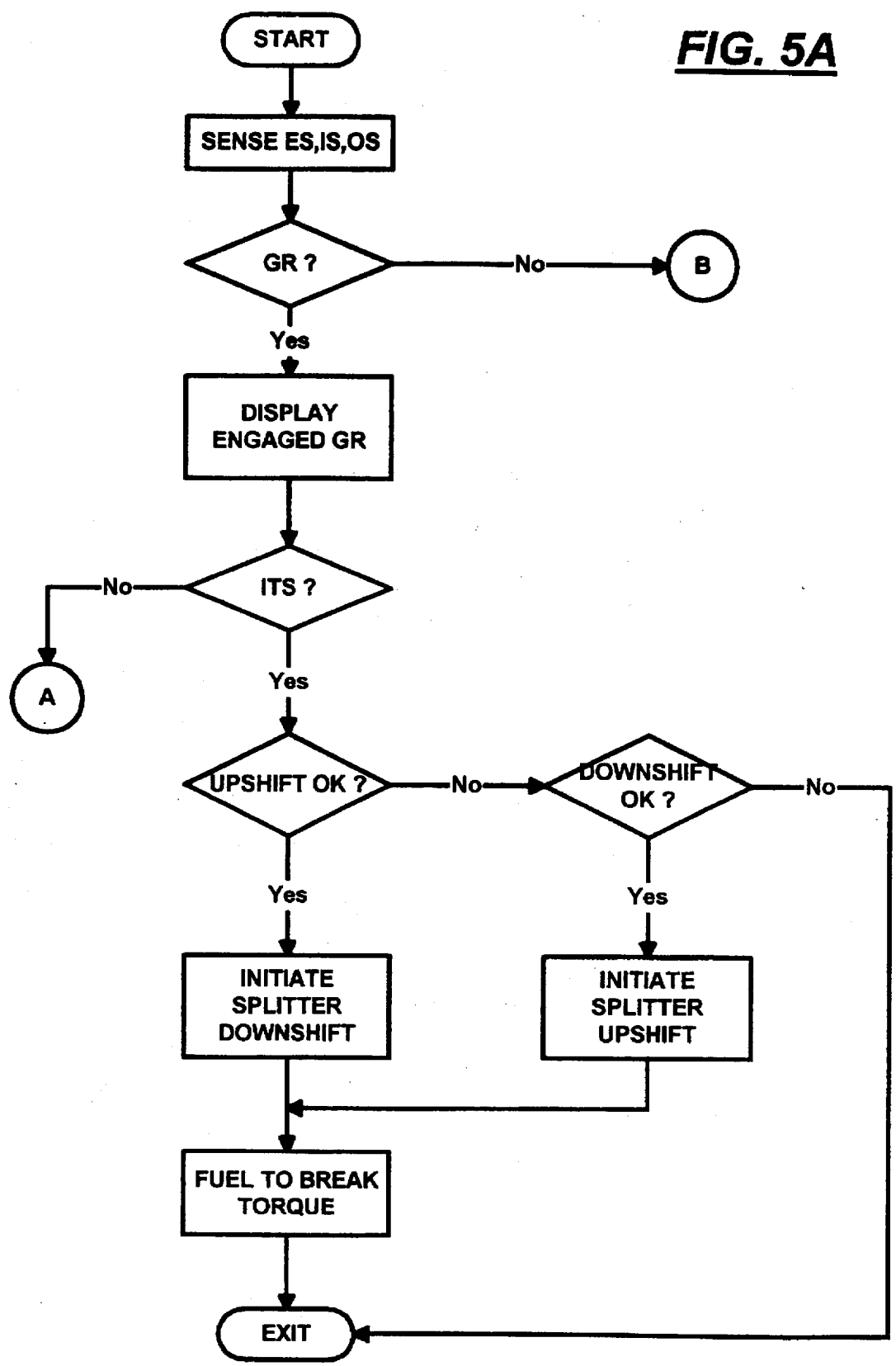
FIGS. 5A–5D are schematic illustrations, in flow chart format, of a preferred embodiment of the present invention.
Figure 5B:
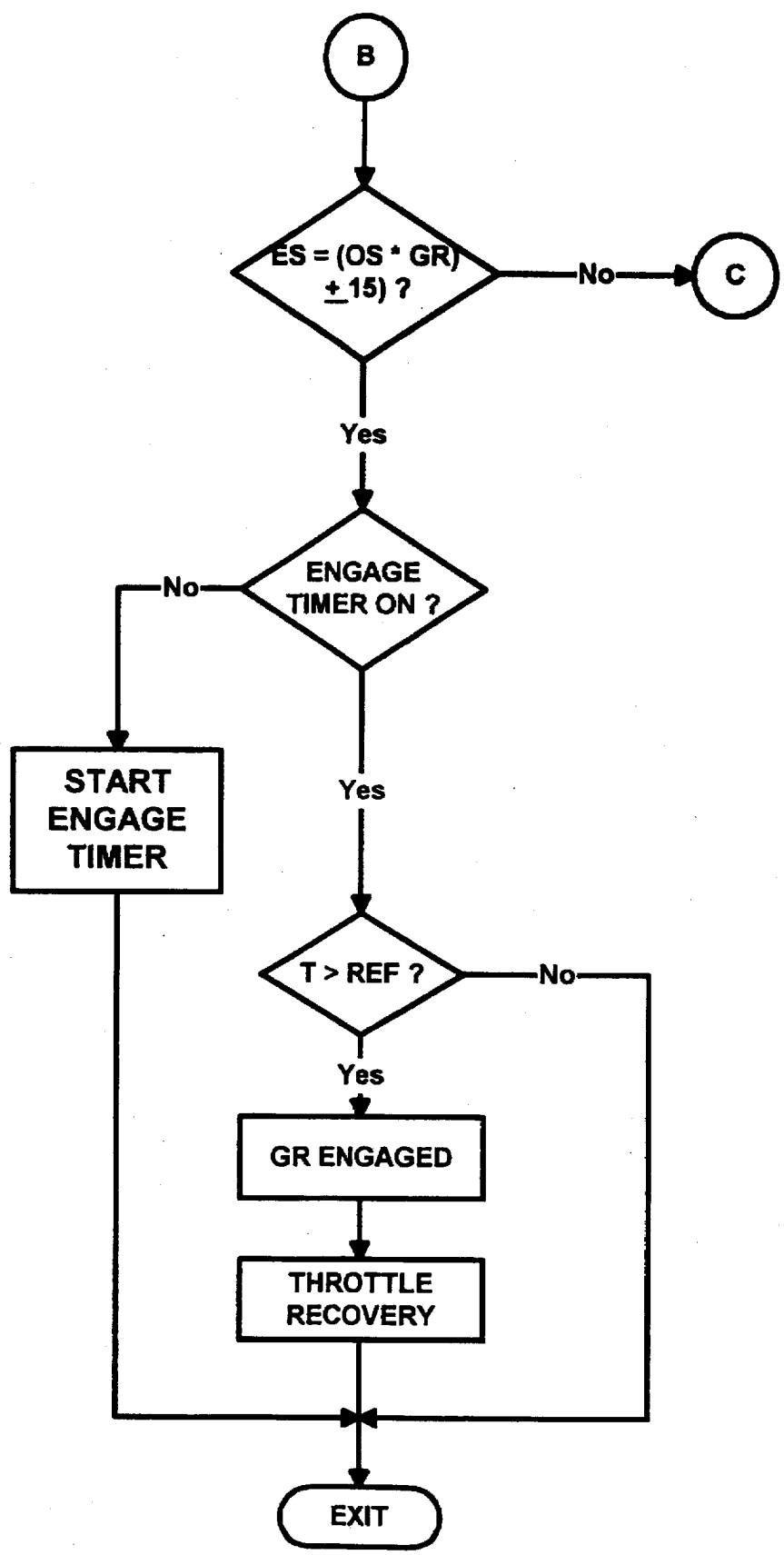
Figure 5C:
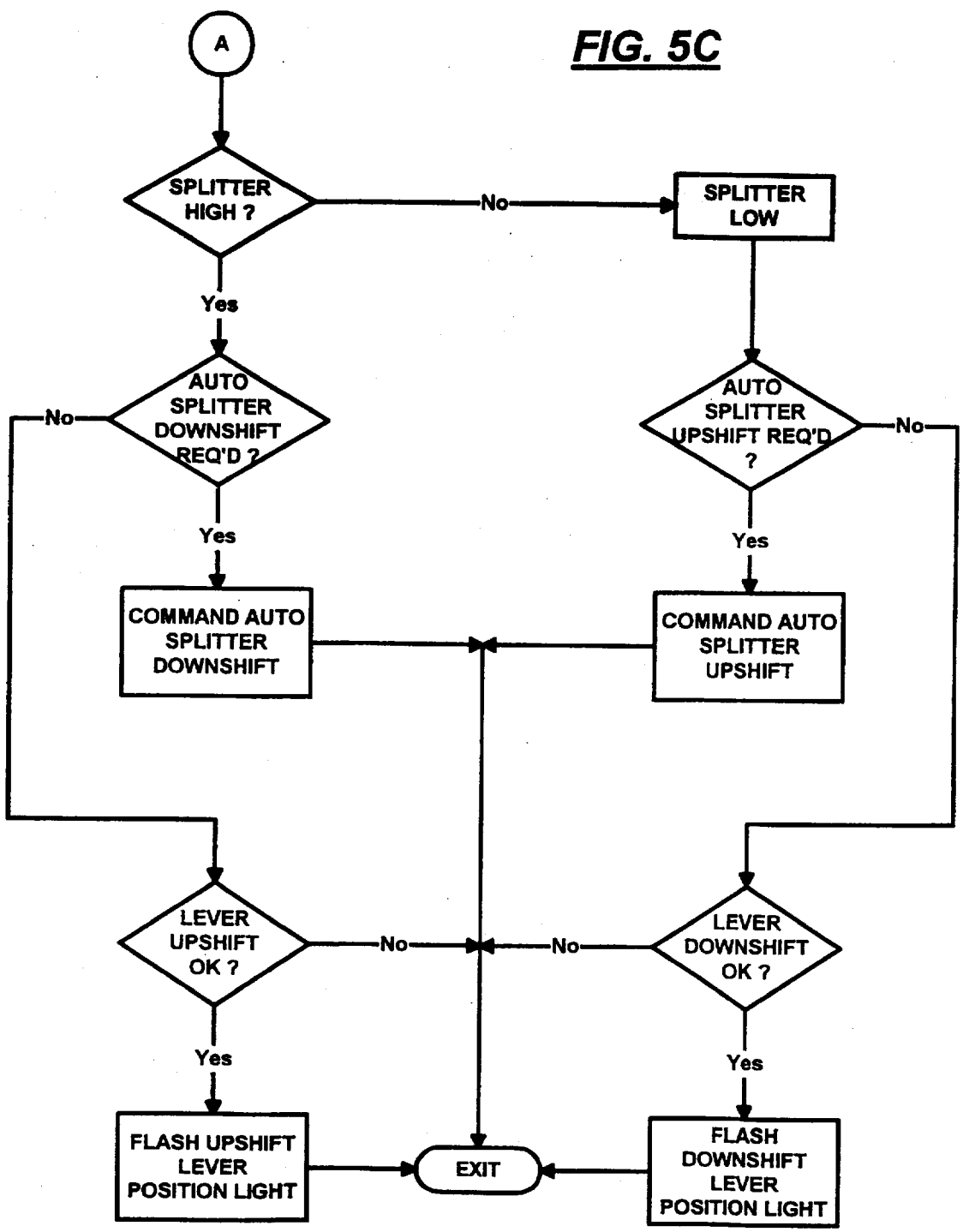
Figure 5D:
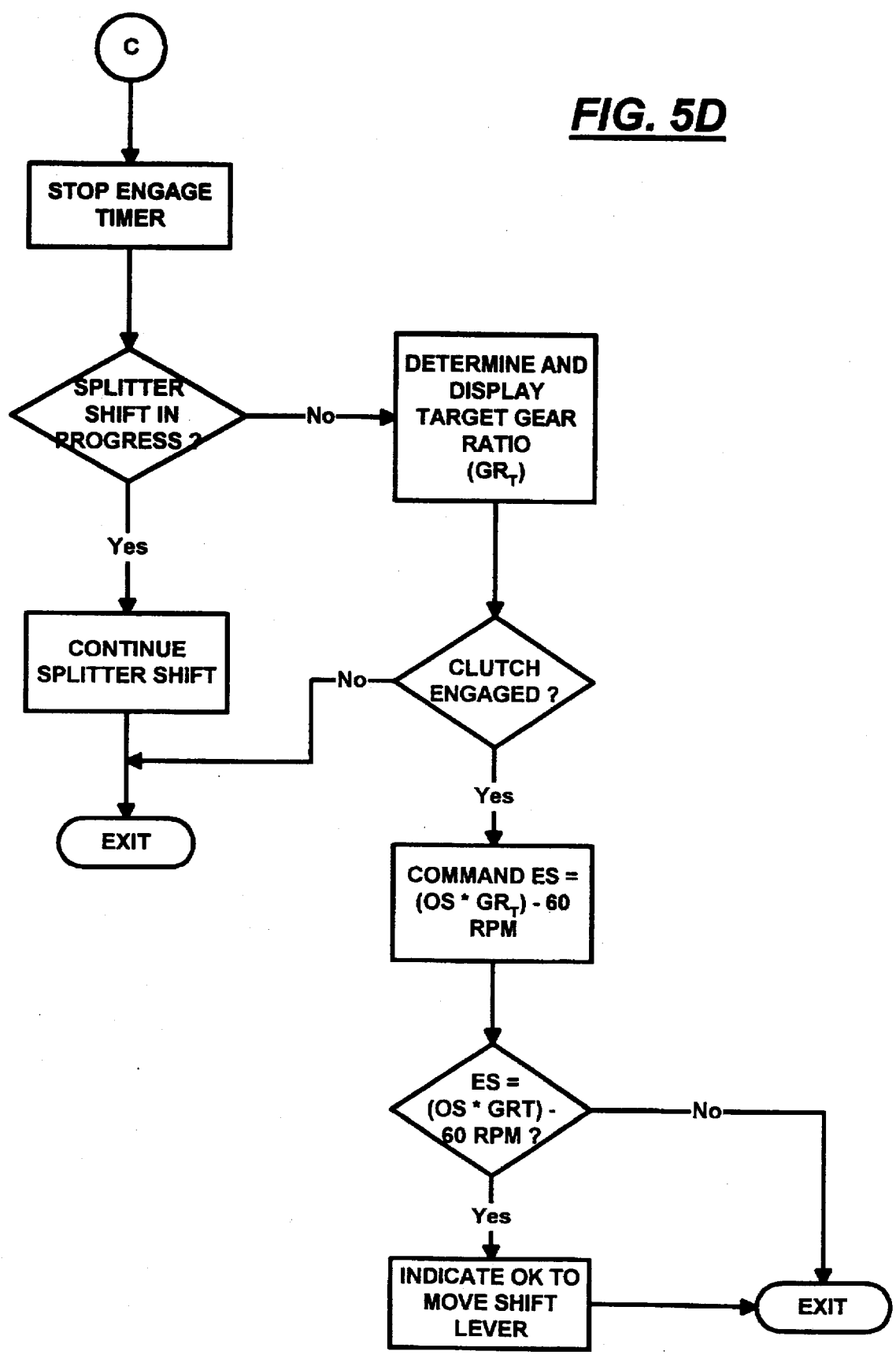

When in an even numbered ratio (i.e., when in the high splitter ratio) and above a given engine speed/input shaft speed (for example, about 1,375 RPM for a diesel engine governed to about 2,100 RPM), a lever upshift (with an automatic splitter downshift) is appropriate and the system, if requested by the driver, will semi-automatically inplement same. Similarly, when in an odd numbered ratio (i.e., when in the low splitter ratio) and below a given engine speed (for example, about 1,350 RPM for the same engine), a lever downshift (with an automatic splitter upshift) is appropriate and the system, if requested by the driver, will semi-automatically implement same. FIG. 4 illustrates the automatic splitter shift points and the appropriate lever shift points. It is noted that splitter shifts are automatically implemented, while lever shifts, with accompanying splitter shifts, require driver initiation and main section jaw clutch manipulation.

The display unit 124 will inform the driver of the currently engaged ratio lever position and the lever position of the currently appropriate lever shift, if any. In one embodiment, the lever position of the currently engaged ratio will be indicated by a steadily lighted button, while the lever position of the appropriate lever shift will be indicated by a flashing button.

Assuming fourth gear is engaged and input shaft speed is 1,525 RPM, the ¾ button 130 will be steadily lit, indicating that third or fourth gear is engaged and, as an upshift into fifth is appropriate, the ⅚ button 132 will flash. The driver may choose to remain in fourth or decide that a shift into fifth is desirable.

If the driver moves the lever to neutral and neutral is confirmed with the master clutch engaged, the ¾ button will be extinguished, while the controller 146 issues commands to the engine controller to cause the engine and input shaft speeds to approach the synchronous values therefor, when the appropriate splitter shift is completed (in this example, a splitter shift from splitter-high to splitter-low). Upon confirmation that synchronous conditions exist, the operator may shift easily into the ⅚ lever position without the use of the clutch. Upon confirmation that fifth is engaged, the ⅚ button 132 will be lit in a steady manner.

Preferably, the shift knob 118 will include a sensor or an intent-to-shift button 120 by which the driver will indicate that he intends to initiate a lever shift sequence. Upon receiving the intent-to-shift signal (ITS), the controller 146 will issue commands to relieve torque lock by throttle manipulations and preselect the required splitter shift. This will allow easy shifting from the engaged ratio (fourth) into neutral without operator throttle manipulation or clutch disengagement, as well as providing a rapid splitter shift. Engine manipulations to relieve torque lock without requiring clutch disengagement is described in greater detail in aforementioned U.S. Pat. Nos. 4,850,236 and 5,105,357.

When in neutral, the operator normally will develop a rhythm of when to shift into the target ratio. Alternatively, the system may inform the operator of when the engine speed is at or is approaching synchronous sufficiently to allow the lever to be moved into the target lever position. This may be by an audible alarm, a separate "okay-to-shift" light and/or simply changing the frequency of flashing the target lever position button. Alternatively, as shown in U.S. Pat. No. 4,023,443, the disclosure of which is incorporated herein by reference, informing the operator may comprise preventing or inhibiting shifting until properly synchronous conditions exist. Also, instead of lighting an entire position button, such as the ¾ lever position button 130, individually controlled, lighted buttons or the like may be provided for each ratio (i.e., a separately controlled display element for each of the two reverse and ten forward-speed ratios).

Upon completion of a shift and confirmation thereof, control of fueling is returned to the operator. The clutch pedal 115 is not intended to be used, except for start-from-stop operations. If the clutch is manually disengaged during a shifting operation, throttle control is immediately returned to the operator.

Output speed (OS) is constantly monitored and, if speed changes cause a change in "best gear" during a shift sequence, a new "best gear" will be indicated by a flashing button and will be synchronized for.

In the absence of an intent-to-shift sensor, to accomplish a lever shift (such as a fourth-to-fifth shift), the operator will shift from the ¾ lever position to neutral, at which time, if the clutch 104 is engaged, the controller will then initiate the required splitter downshift and will fuel the engine 102 to cause synchronous engine and input shaft speed for engaging the fifth gear target ratio (ES=IS=(OS*3.16)±X). Upon engagement of fifth gear and confirmation thereof, the ⅝ button will be steadily lighted and fueling control will be returned to the operator. Under many operating conditions, the shift to neutral will require operator manipulation of the throttle and/or master clutch.

Similar logic may be utilized to control or sense a speed difference at the engaged or engaging clutch teeth. In that case, clutches 48 and 50 are rotating at output shaft speed times the auxiliary section ratio in the target gear ratio ($OS*GR_{AT}$), while the clutch member fixed to the gear is rotating at input shaft speed times the main section ratio in the target gear ratio ($IS*GR_{MT}$). By way of example, to cause a 60 RPM difference across the engaging main section clutch, assuming the auxiliary section is properly engaged, engine speed and input shaft speed would be ES=IS= $((OS*GR_{AT})-60)/GR_{MT}$.

While many of the features of the control system/method of the present invention are applicable to many types of transmissions, the present invention is especially well suited to a splitter-type transmission or a combined splitter-and-range-type transmission with an automatic range shifting feature (see U.S. Pat. No. 5,000,060, the disclosure of which is incorporated herein by reference), as these types of transmissions utilize a minimal number of lever shifts for a given number of forward ratios. Preferably, if no lever shift is then appropriate, the intent-to-shift signal will not be acted upon.

In the event of a complete or partial failure of system 100, transmission 10 can be driven, in a limp-home mode, as a wide ratio step two-, three- or five-forward-speed transmission.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling an at least partially automated transmission system including a mechanical transmission having an input shaft driven by a controllable engine, an output shaft, and having a plurality of selectively engageable and disengageable jaw clutches for selectively engaging and disengaging selected gear ratios having known numerical values, sensing means for providing signals indicative of input shaft (IS) and output shaft (OS) rotational speeds and a system controller for receiving input signals including said signals indicative of input shaft and output shaft rotational speeds and for processing same in accordance with predetermined logic rules to issue command output signals to system actuators including an engine controller for controlling rotational speed of said motor, said method comprising:

to engage a target gear ratio ($GR_T$) from neutral, commanding said engine controller to cause said engine to rotate at a speed (ES) causing the input shaft speed to equal the sum of (i) the product of output shaft speed and the numerical value of the target gear ratio, plus (ii) the value of a first offset (X) where ES=IS=($OS*GR_T$)+X; and determining engagement of a gear ratio when, for a first predetermined period of time, sensed input shaft speed is equal to or greater than the difference of (i) the product of output shaft speed and the numerical value of the target gear ratio, minus (ii) a second positive offset and is equal to or less than the sum of (i) the product of output shaft speed and the numerical value of the target gear ratio, plus (ii) said second positive offset (Y) where (($OS*GR_T$)−Y)≦IS≦(($OS*GR_T$)+Y), the absolute value of the first offset exceeding the value of the second offset |X|≧Y.

2. The method of claim 1 wherein said absolute value of said first offset is equal to or greater than twice the value of said second offset |X|≧2Y.

3. The method of claim 1 wherein said first offset has a negative value.

4. The method of claim 2 wherein said first offset has a negative value.

5. The method of claim 1 wherein the absolute value of the first offset is equal to about 40 to 60 RPM.

6. The method of claim 2 wherein the absolute value of the first offset is equal to about 40 to 60 RPM.

7. The method of claim 3 wherein the absolute value of the first offset is equal to about 40 to 60 RPM.

8. The method of claim 1 wherein said predetermined period of time is equal to about 100 to 400 milliseconds.

9. The method of claim 2 wherein said predetermined period of time is equal to about 100 to 400 milliseconds.

10. The method of claim 3 wherein said predetermined period of time is equal to about 100 to 400 milliseconds.

11. The method of claim 5 wherein said predetermined period of time is equal to about 100 to 400 milliseconds.

12. The method of claim 1 wherein the value of said second offset is about 10 to 20 RPM.

13. The method of claim 2 wherein the value of said second offset is about 10 to 20 RPM.

14. The method of claim 5 wherein the value of said second offset is about 10 to 20 RPM.

15. The method of claim 6 wherein the value of said second offset is about 10 to 20 RPM.

16. The method of claim 1 further comprising:

determining disengagement of all gear ratios when, for a first predetermined period of time, sensed input shaft speed is not equal to or greater than the difference of (i) the product of output shaft speed and the numerical value of any of the gear ratios, minus (ii) a third positive offset and is equal to or less than the sum of (i) the product of output shaft speed and the numerical value of any of the gear ratios, plus (ii) said third positive offset (Z) where (($OS*GR_T$)−Z)≦IS≦(($OS*GR_T$)+Z), the absolute value of the first offset exceeding the value of the third offset |X|>Z.

17. A control system for controlling an at least partially automated transmission system including a mechanical transmission, an input shaft driven by a controllable engine and an output shaft, and having a plurality of selectively engageable and disengageable jaw clutches for selectively engaging and disengaging selected gear ratios having known numerical values, sensing means for providing signals indicative of input shaft (IS) and output shaft (OS) rotational speeds and a system controller for receiving input signals including said signals indicative of input shaft and output shaft rotational speeds and for processing same in accordance with predetermined logic rules to issue command output signals to system actuators including an engine controller for controlling rotational speed of said motor, said logic rules including rules effective:

to engage a target gear ratio ($GR_T$) from neutral by commanding said engine controller to cause said engine to rotate at a speed (ES) causing the input shaft speed to equal the sum of (i) the product of output shaft speed and the numerical value of the target gear ratio, plus (ii) the value of a first offset (X) where $ES=IS=(OS*GR_T)+X$; and to determine engagement of a gear ratio when, for a first predetermined period of time, sensed input shaft speed is equal to or greater than the difference of (i) the product of output shaft speed and the numerical value of the target gear ratio, minus (ii) a second positive offset and is equal to or less than the sum of (i) the product of output shaft speed and the numerical value of the target gear ratio, plus (ii) said second positive offset (Y) where $((OS*GR_T)-Y) \leq IS \leq ((OS*GR_T)+Y)$, the absolute value of the first offset exceeding the value of the second offset $|X|>Y$.

18. The control system of claim 17 wherein said absolute value of said first offset is equal to or greater than twice the value of said second offset $|X| \geq 2Y$.

19. The control system of claim 17 wherein said first offset has a negative value.

20. The control system of claim 18 wherein said first offset has a negative value.

21. The control system of claim 17 wherein the absolute value of the first offset is equal to about 40 to 60 RPM.

22. The control system of claim 18 wherein the absolute value of the first offset is equal to about 40 to 60 RPM.

23. The control system of claim 19 wherein the absolute value of the first offset is equal to about 40 to 60 RPM.

24. The control system of claim 20 wherein said predetermined period of time is equal to about 100 to 400 milliseconds.

25. The control system of claim 18 wherein said predetermined period of time is equal to about 100 to 400 milliseconds.

26. The control system of claim 19 wherein said predetermined period of time is equal to about 100 to 400 milliseconds.

27. The control system of claim 21 wherein said predetermined period of time is equal to about 100 to 400 milliseconds.

28. The control system of claim 17 wherein said engine controller comprises a microprocessor-based computer mounted to said engine and having a memory, said logic rules stored in said memory.

29. The method of claim 17 wherein the value of said second offset is about 10 to 20 RPM.

30. The method of claim 18 wherein the value of said second offset is about 10 to 20 RPM.

31. The method of claim 21 wherein the value of said second offset is about 10 to 20 RPM.

32. The method of claim 22 wherein the value of said second offset is about 10 to 20 RPM.

33. A microprocessor-based system controller for controlling an at least partially automated transmission system including a mechanical transmission having an input shaft driven by a controllable engine, an output shaft, and having a plurality of selectively engageable and disengageable jaw clutches for selectively engaging and disengaging selected gear ratios having known numerical values, sensing means for providing signals indicative of input shaft (IS) and output shaft (OS) rotational speeds and an engine fuel controller for controlling rotational speed of said engine, said system controller receiving input signals including said signals indicative of input shaft and output shaft rotational speeds and processing same in accordance with predetermined logic rules to issue command output signals to system actuators including said engine fuel controller, said system controller having a memory storing logic rules effective for:

to engage a target gear ratio ($GR_T$) from neutral, commanding said engine controller to cause said engine to rotate at a speed (ES) causing the input shaft speed to equal the sum of (i) the product of output shaft speed and the numerical value of the target gear ratio, plus (ii) the value of a first offset (X) where $ES=IS=(OS*GR_T)+X$; and determining engagement of a gear ratio when, for a first predetermined period of time, sensed input shaft speed is equal to or greater than the difference of (i) the product of output shaft speed and the numerical value of the target gear ratio, minus (ii) a second positive offset and is equal to or less than the sum of (i) the product of output shaft speed and the numerical value of the target gear ratio, plus (ii) said second positive offset (Y) where $((OS*GR_T)-Y) \leq IS \leq ((OS*GR_T)+Y)$, the absolute value of the first offset exceeding the value of the second offset $|X|>Y$.

34. The microprocessor-based system controller of claim 33 wherein said absolute value of said first offset is equal to or greater than twice the value of said second offset $|X| \geq 2Y$.

35. The microprocessor-based system controller of claim 33 wherein the absolute value of the first offset is equal to about 40 to 60 RPM.

36. The microprocessor-based system controller of claim 33 wherein said predetermined period of time is equal to about 100 to 400 milliseconds.

37. The microprocessor-based system controller of claim 34 wherein said predetermined period of time is equal to about 100 to 400 milliseconds.

38. The microprocessor-based system controller of claim 35 wherein the value of said second offset is about 10 to 20 RPM.

39. The microprocessor-based system controller of claim 33 wherein said microprocessor-based system controller is a portion of an engine-mounted microprocessor-based engine control unit.

\* \* \* \* \*